(12) United States Patent
Fuller et al.

(10) Patent No.: US 9,083,049 B2
(45) Date of Patent: Jul. 14, 2015

(54) ADDITIVES FOR FUEL CELL LAYERS

(75) Inventors: Timothy J. Fuller, Pittsford, NY (US); Michael R. Schoeneweiss, West Henrietta, NY (US); Tao Xie, Troy, MI (US); Frank Coms, Fairport, NY (US); Sean M. MacKinnon, West Henrietta, NY (US); Gerald W. Fly, Geneseo, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1627 days.

(21) Appl. No.: 11/549,814

(22) Filed: Oct. 16, 2006

(65) Prior Publication Data
US 2008/0166620 A1 Jul. 10, 2008

(51) Int. Cl.
H01M 2/02 (2006.01)
H01M 4/86 (2006.01)
H01M 8/10 (2006.01)

(52) U.S. Cl.
CPC .......... *H01M 4/8657* (2013.01); *H01M 4/8652* (2013.01); *H01M 8/103* (2013.01); *H01M 8/1023* (2013.01); *H01M 8/1027* (2013.01); *H01M 8/1032* (2013.01); *H01M 8/1039* (2013.01); *H01M 8/1048* (2013.01); *H01M 8/1051* (2013.01); *H01M 8/1053* (2013.01); *H01M 8/1067* (2013.01); *H01M 8/1069* (2013.01); *H01M 2300/0091* (2013.01); *H01M 2300/0094* (2013.01); *Y02E 60/522* (2013.01)

(58) Field of Classification Search
None
See application file for complete search history.

(56) References Cited

U.S. PATENT DOCUMENTS

| 6,242,135 | B1 * | 6/2001 | Mushiake | 429/304 |
|---|---|---|---|---|
| 6,335,112 | B1 | 1/2002 | Asukabe et al. | |
| 2002/0107140 | A1 * | 8/2002 | Hampden-Smith et al. | 502/185 |
| 2004/0018430 | A1 * | 1/2004 | Holman et al. | 429/233 |
| 2004/0043283 | A1 | 3/2004 | Cipollini et al. | |
| 2004/0224216 | A1 | 11/2004 | Burlatsky et al. | |
| 2005/0095355 | A1 | 5/2005 | Leistra et al. | |
| 2005/0136308 | A1 * | 6/2005 | Andrews et al. | 429/30 |
| 2006/0019140 | A1 * | 1/2006 | Kawazoe et al. | 429/33 |
| 2006/0046120 | A1 | 3/2006 | Merzougui et al. | |
| 2006/0105215 | A1 * | 5/2006 | Panambur et al. | 429/30 |
| 2007/0099052 | A1 * | 5/2007 | Frey et al. | 429/33 |

FOREIGN PATENT DOCUMENTS

| CN | 1674328 A | 9/2005 |
|---|---|---|
| DE | 69425196 | 12/2000 |
| DE | 10130828 | 1/2003 |

(Continued)

OTHER PUBLICATIONS

Japanese Office Action JP2007-264346; Mailed Aug. 31, 2011; 3 pages.

(Continued)

*Primary Examiner* — Barbara Gilliam
*Assistant Examiner* — Adam A Arciero
(74) *Attorney, Agent, or Firm* — BrooksGroup

(57) ABSTRACT

A fuel cell comprising: a first layer comprising a first ionomer and an additive, the additive comprising a metal oxide comprising an oxide at least one of of Ce, Mn, V, Pt, Ru, Zr, Ni, Cr, W, Co, Mo, or Sn, and wherein the additive is present in at least 0.1 weight percent of the ionomer is disclosed as one embodiment of the invention, and performance and durability are advantaged wherein one or all of the metal oxide consists essentially nanoparticles.

25 Claims, 2 Drawing Sheets

(56) References Cited

FOREIGN PATENT DOCUMENTS

| | | |
|---|---|---|
| DE | 69717674 | 12/2003 |
| JP | 2001-118591 | 4/2001 |
| JP | 2001118591 A | 4/2001 |
| JP | 2004134294 A | 4/2004 |
| JP | 2005019232 A | 1/2005 |
| JP | 2005120198 A | 5/2005 |
| JP | 2005061629 A1 | 7/2005 |
| JP | 2006269133 A | 10/2006 |
| WO | WO2005/060039 | 6/2005 |
| WO | WO2005/071779 | 8/2005 |
| WO | WO2005/124911 | 12/2005 |

OTHER PUBLICATIONS

Japanese Office Action dated Oct. 21, 2013; Application No. 2012-137595; Applicant: GM Global Technology Operations; 5 pages.

* cited by examiner

ADDITIVES FOR FUEL CELL LAYERS

TECHNICAL FIELD

The technical field to which the description of exemplary embodiments generally relates includes fuel cells and fuel cell components including an ionomer layer, membrane, catalyst, substrate, and the like, and methods of making and using the same.

BACKGROUND

Fuel cells using solid polyelectrolyte membranes and electrodes are known. Those skilled in the art are continually working on improvements and alternatives to existing fuel cells, fuels components, and methods of making and using the same.

SUMMARY OF EXEMPLARY EMBODIMENTS

A product comprising: a first layer comprising an ionomer and an additive. The additive comprises a metal oxide comprising an oxide of at least one of Ce, Mn, V, Pt, Ru, Zr, Ni, Cr, W, Co, Mo or Sn. The additive may be present in at least 0.1 weight percent of the ionomer.

Other exemplary embodiments of the invention will be apparent from the following brief description of the drawings, detailed description of exemplary embodiments, and appended claims and drawings.

BRIEF DESCRIPTION OF THE DRAWINGS

The exemplary embodiments of the invention will become more fully understood from the detailed description and the accompanying drawings, wherein.

DETAILED DESCRIPTION OF THE EXEMPLARY EMBODIMENTS

The following description of the following embodiment(s) is merely exemplary in nature and is in no way intended to limit the claimed invention, its application, or uses.

Figure 1:
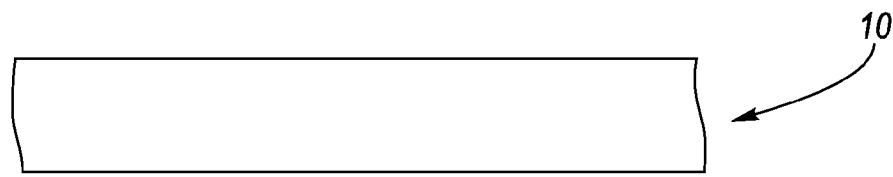
FIG. 1 illustrates a product according to one embodiment of the invention.

Referring now to FIG. 1, one embodiment of the invention includes a fuel cell substrate 10 including an ionomer and an additive. Substrate 10 may be a membrane or an electrode, In various embodiments of the invention, the additive improves cell performance, membrane durability and/or proton conduction. In one embodiment of the invention, the additive includes an oxide of at least one of Ce, Mn, V, Pt, Ru, Zr, Ni, Cr, W, Co, Mo or Sn or derivates thereof. In still another embodiment of the invention, the additive is a metal oxide including, but is not limited to, $MnO_2$, $CeO_2$, $PtO_2$, $RuO_2$, VO, $VO_2$, $V_2O_3$, $V_2O_5$, $CeO_2$, CoO, $Co_2O_3$, $NiO_2$, $CrO_2$, $WO_3$, $SnO_2$, $MoO_3$, $MoO_2$, $Mn_2O_3$, and/or derivatives thereof, including but not limited to, tertiary and/or quaternary compounds. In one embodiment the additive includes nanoparticles of ceria ($CeO_2$), $CeZrO_4$ or $Ce_{1-x}Zr_xO_2$, where X is less than 1. In another embodiment of the invention, the additive includes a combination of metal oxides including, but not limited to, $CeO_2$ and $MnO_2$ (preferred), $CeO_2$ and CoO; $CeO_2$ and $Co_2O_3$; $CeO_2$ and VO; $CeO_2$ and $VO_2$; $CeO_2$ and $V_2O_3$; $CeO_2$ and $V_2O_5$; $CeO_2$, $NiO_2$ or $CrO_2$ in combination with at least one of $CeO_2$, $MoO_3$, $MoO_2$, $MnO_2$, $Mn_2O_3$, $RuO_2$, $WO_3$, $PtO_2$ or $SnO_2$. In one embodiment of the invention, the additive may include nanoparticles. That is, particles having at least one dimension that is less than 200 nm. The use of nanoparticles was found to improve the performance of the membrane assemblies compared to assemblies using marcoparticles.

The ionomer may be a polymeric macromolecule including a portion of its constituent units having ionizable or ionic groups, or both. In one embodiment of the invention, the ionomer includes polymeric molecules having carbon-fluorine backbone chains with perfluoro side chains containing sulfonic groups (also known as perfluorosulfonic acid polymers.) Such ionomers are available from E. I. DuPont de Nemours & Company under the trade designation NAFION®. Other such ionomers are available from Asahi Glass & Asahi Chemical Company. In alternative embodiments, the ionomer may include perfluorinated cation exchange polymers, hydrocarbon-based cation exchange ionomers, as well as anion-exchange ionomers. In other alternative embodiments, the ionomer includes sulfonated hydrocarbon polymers including aromatic and non-aromatic sulfonic acid polymers, including sulfonated-polysulfones, -polyetheretherketone, -polyarylene ether ketones, -polyarylenethioether ketones, -polyarylene ether sulfones, -polyarylenethioether sulfones, -polybenzimidazoles, -polyimides, -polyphenylenes or -polyphenylenesulfide.

Figure 2:
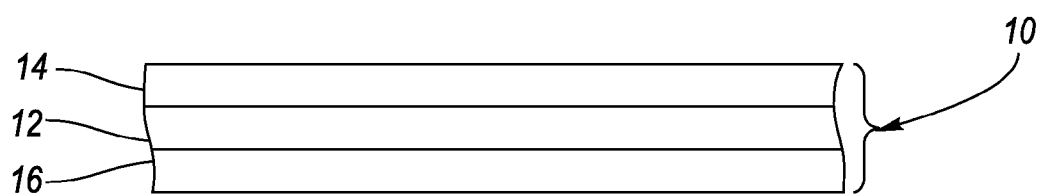
FIG. 2 illustrates a product according to another embodiment of the invention.

In various illustrative embodiments of the invention, the additive may be present in at least 0.1 weight percent (wt. %), about 1 to about 20 wt. %, about 5 to about 15 wt. %, or about 8 to about 12 wt. % of the dried ionomer 10. The additive may be present in greater amounts, however, too high oxide loading in the membrane may result in brittle membranes that are easy to tear apart. The additive may be mixed with the ionomer in wet form, including water and alcohol. In the wet phase of the mixture, the water may be present in about 40 to about 60 wt. % and the alcohol present in about 40 to about 60 wt. %. In some embodiments of the invention, the additive is introduced into the mixture with a metal oxide purity ranging from about 90-100 percent or about 99.99-100 percent. For example, for an additive including $MnO_2$ having a metal oxide purity ranging from 90-100 percent pure, the metal oxide includes 90-100 wt. % $MnO_2$ and 0-10 wt. % impurities, such as impurities that are typically found in Mn ore or in the manufacture of $MnO_2$. In various embodiments of the invention, the substrate 10 including the ionomer and additive may have a thickness, in the dried state, of less than 100 microns, from about 5-50 microns, and from about 10-40 microns or thicknesses therebetween. When $MnO_2$ at less than 5-micrometers in particle dimensions and a purity of 85 percent was added to a 20 wt. % Nafion 1000 (DE 2020) dispersion in 1-propanol-water (available from E. I. DuPont de Nemours and Company), the ionomer aggregated after 1 hour and the dispersion was no longer coatable. Hence, a dispersion of 85 wt. % $MnO_2$ in Nafion 1000 (at 10 wt. % loading of $MnO_2$ per ionomer solids) must be coated into films within 1 hour. This does not take place with high-purity $MnO_2$. Referring now to FIG. 2, in another embodiment of the invention, the substrate 10 may include a first layer 12, a second layer 14 overlying the first layer 12, and a third layer 16 underlying the first layer 12. In one embodiment of the invention, the first layer 12 includes an ionomer but without any metal oxide. The second layer 14 and the third layer 16 each include an ionomer and an additive, such as a metal oxide. Each of the first layer 12, second layer 14 and third layer 16 may have a thickness, in the dried state, ranging from 5-50 microns, 5-35 microns, 10-35 microns, or thicknesses therebetween. A cathode catalyst layer may overlie the first layer 12 and an anode catalyst layer may underlie the third layer 16, and wherein both the second and third layers 14 and 16 have an additive therein that may be the same or different from each other.

Figure 3:
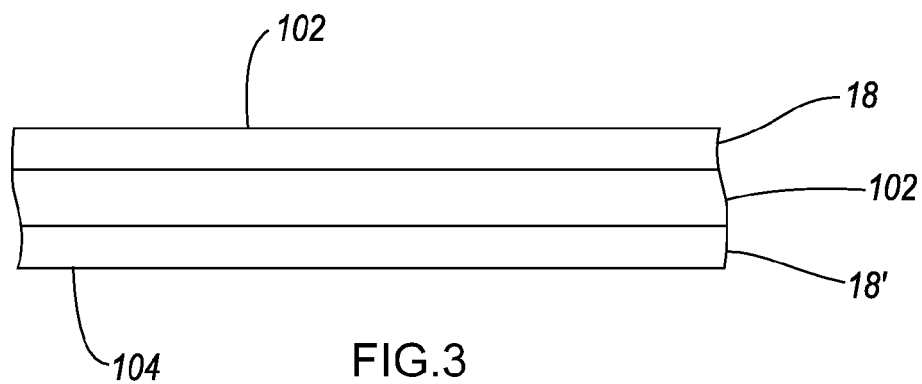
FIG. 3 illustrates a product according to another embodiment of the invention.

Referring now to FIG. 3, in another embodiment of the invention, a solid polyelectrolyte membrane 100 is provided and is substantially free of metal oxides. A first catalyst layer 18 is provided overlying the membrane and a second catalyst layer 18' is provided underlying the membrane 100. At least one of the first catalyst layer 18 or second catalyst layer 18' includes an additive, such as a metal oxide, present in at least one weight percent of the dried ionomer in the catalyst layer 18 or 18'. The additive in layers 18 and 18' may be the same or different from each other.

Figure 4:
FIG. 4 illustrates a product according to another embodiment of the invention.

Referring now to FIG. 4, one embodiment of the invention may include a bilayer membrane 10 including a first portion 12 and a second portion 14. A first catalyst layer (for example an anode) may overlie the membrane 10 and a second catalyst layer 18' may underlie the membrane 10. The first portion 12 may include a first additive such as a first metal oxide and the second portion 14 may include a second additive such as a second metal oxide. The first additive may include a metal oxide that is different from the metal oxide of the second additive. For example, the first portion 12 (adjacent the cathode 18') may include $MnO_2$ and the second portion 14 (adjacent the anode 18) may include $CeO_2$. In another embodiment at least one of the catalyst layers 18, 18' may include the first additive and at least a portion of the membrane 10 may include the second additive, wherein the membrane 10 may be made from a single layer or multiple layers. For example, the anode layer 18 may include $CeO_2$ and the first portion 12 (adjacent the cathode) of the membrane 10 may include $MnO_2$, and wherein the second portion 14 of the membrane 10 and the cathode 18' may or may not include a metal oxide additive.

Figure 5:
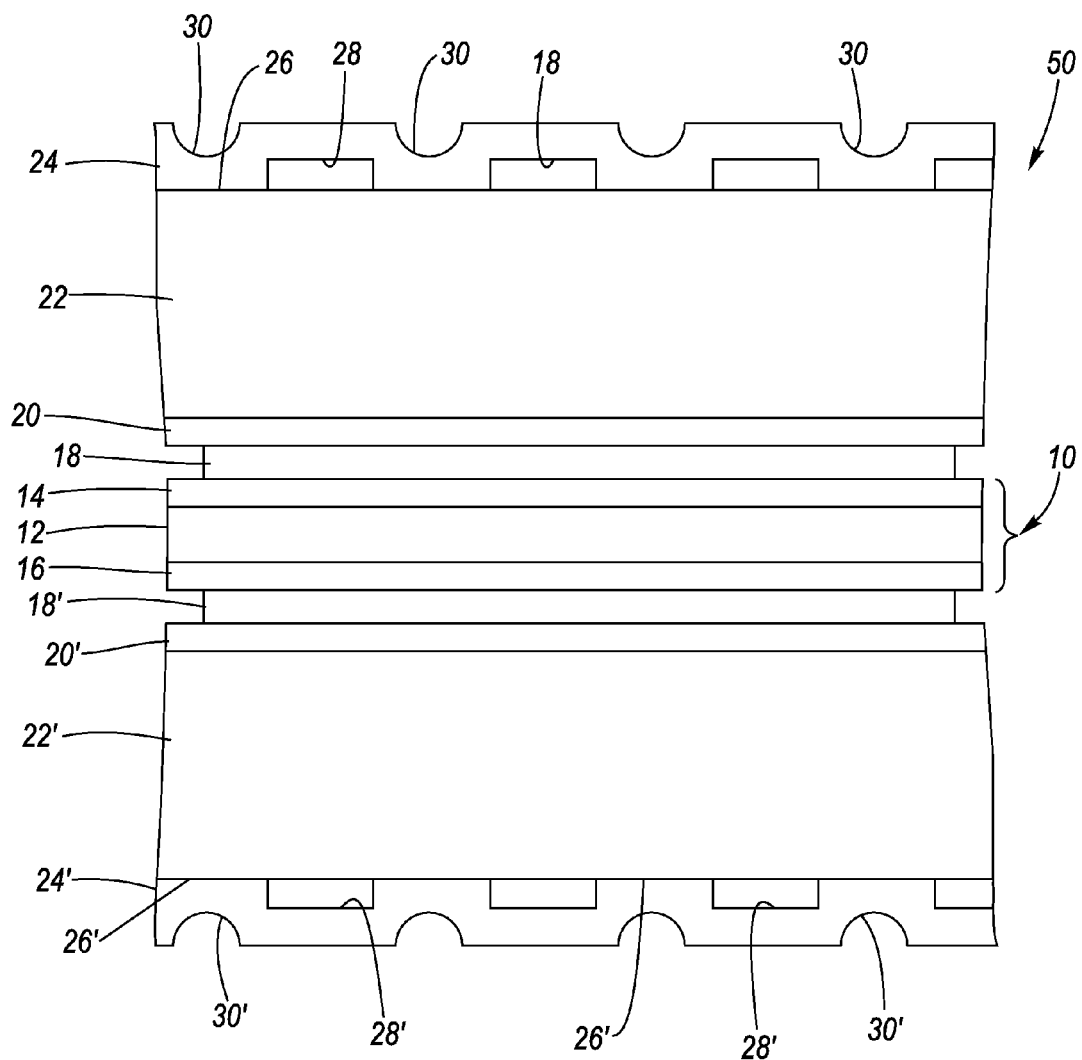
FIG. 5 illustrates a product according to another embodiment of the invention.

Referring now to FIG. 5, one embodiment of the invention includes a product including a fuel cell substrate 10 which functions as a proton exchange membrane. The substrate 10 includes a first layer 12 including an ionomer without a metal oxide. A second layer 14 is provided over the first layer 12 and a third layer 16 is provided under the first layer 12. Each of the second layer 14 and third layer 16 includes an ionomer and an additive such as a metal oxide or a mixture of metal oxides. As such, the substrate 10, in this case a polyelectrolyte membrane, includes a central portion that is free of the metal oxide additive. A first catalyst layer 18 is provided over the second layer 14 of the substrate 10. A first gas diffusion media substrate 22 may be provided over the first catalyst layer 18, and optionally, a microporous layer 20 may be interposed between the diffusion media substrate 22 and the first catalyst layer 18. Diffusion media substrate 22 may include, but is not limited to, a carbon paper substrate. The microporous layer 20 may be coated on the diffusion media substrate 22 from a mixture of carbon and fluoropolymer such as FEP, PVDF, HFP, PTFE, etc. The first catalyst layer 18 preferably includes a group of finally divided catalyst support particles, such as carbon, supporting finally divided catalyst particles and an ion conductive material, intermingled with the support and catalyst particles. The ion conductive material in the first catalyst layer 18 may be an ionomer such as perfluorinated sulfonic acid polymer. Catalyst materials may include, but are not limited to, metals such as platinum, palladium and mixtures of metals such as platinum and molybdenum, platinum and cobalt, platinum and ruthenium, platinum and nickel, and platinum and tin, or platinum transition-metal alloys. A first bipolar plate 24 may be provided having gas flow field channels 28 and lands 26 formed in one face, and cooling channels 30 formed in another face. Likewise, a second catalyst layer 18', a second microporous layer 20', a second gas diffusion media substrate 22' and second bipolar plate 24' may be provided on the opposite side of the fuel cell substrate 10 in a similar fashion to form a fuel cell assembly 50.

In one embodiment of the invention, a slurry is prepared including an ionomer, additive and a solvent. The solvent may include at least one of 1-propanol, ethanol, 1-butanol, methanol, or the like or water. The slurry may be milled, for example, using glass beads and thereafter filtered, for example, using a mesh having openings therein less than 90 micron. The filtered slurry may be cast and dried as a single layer or multiple layers may be cast and dried to form, in one embodiment of the invention, a multi-layer membrane wherein at least one of the layers includes the additive.

Processes other than ball-milling can be used to form the metal oxide ionomer dispersions. Other known wet mixing methods and melt processes can be used including: attritors, homogenizers, mixers, polytron heads, melt extruders, Banbury roll mills, and other such mixing equipment can be used. Illustrative examples of making membranes are also set forth in Examples 8 and 9 below.

Fuel cell test were perform for membrane electrode assemblies using a catalyst coated diffusion media and a membrane of NAFION (N1000) and an additive including an oxide of $Mo^{6+}, V^{5+}, V^{3+}$, Cr/Zr, alone or with ceria, and the membrane assemblies were found to run every condition. The conditions for which these membranes were evaluated with catalyst coated diffusion media was as follows: Membranes were screened in fuel cells and performance were summarized in polarization curves where cell voltage (in volts) is plotted versus current density (in Amps/cm$^2$) under the following conditions: 150% relative humidity (R.H.) out: 2/2 (A/C) stoic; 100/50% (A/C) inlet R.H.; 80° C.; 170 kPa gauge; 110% relative humidity (R.H.) out: 2/2 (A/C) stoic; 100/50% (A/C) inlet R.H.; 80° C.; 50 kPa gauge; 85% relative humidity (R.H.) out: 3/3 (A/C) stoic; 50/50% (A/C) inlet R.H.; 80° C.; 75 kPa gauge; 80% relative humidity (R.H.) out: 2/2 (A/C) stoic; 35/35% (A/C) inlet R.H.; 80° C.; 50 kPa gauge; 63% relative humidity (R.H.) out: 3/3 (A/C) stoic; 32/32% (A/C) inlet R.H.; 80° C.; 50 kPa gauge; where (A/C) refers to anode/cathode. When polarization curves are obtained where the current density runs out to 1.2 A/cm$^2$ with reasonable voltage (usually greater than 0.4V), the membranes are said to "run every condition."

When the terms "over", "overlying", "overlies", or "under", "underlying", "underlies" are used herein with respect to the relative position of one component or layer with respect to a second component or layer, such shall mean that the first component or layer is in direct contact with the second component or layer, or that additional layers or components may be interposed between the first component or layer and the second component or layer.

Examples

Comparitive Example 1

As a control sample, Nafion® solution DE2020 at 20 wt. % polymer solids of Nafion® PFSA polymer with 1000 equivalent weight in 40-wt. % aqueous, 1-propanol (available from E.I. DuPont de Nemours, Co) was cast onto a glass plate with a 3-mil gap Bird applicator, and then the coated glass plate was oven-dried at 80° C. for 30 minutes. A second coating was applied to the first film with the 3-mil gap Bird applicator and the polymer-coated glass plate was heated at 120° C. for 16 hours. The coated glass plate, after cooling to 25° C., was immersed in a de-ionized water bath until the polymer film released from the glass. The polymer film was allowed to air dry on a paper towel, and the resultant dry film was 25-micrometers in thickness. The polymer film was cut into a 4-inch by 4-inch square and was assembled in a fuel cell (50-cm$^2$ hardware) with catalyst coated diffusion media. The performance was measured under dry, intermediate and wet conditions. A durability test was determined under an accelerated 5-minute wet, 5-minute dry protocol, and the life of the membrane was 392 hours before a 40 sccm cross-over leak was detected. The fluoride release during the test was $10^{-5}$ g F$^-$ per cm$^2$ of membrane area per hour. A platinum line had formed on the cathode side where platinum from the catalyst layer had dissolved and diffused into the membrane where presumably the platinum ions then became reduced by diffusing hydrogen gas from the anode.

Example 2

Nafion Membrane with MnO$_2$

The purity of the MnO$_2$ used was 99.99+% available from Aldrich. When samples were prepared wherein the MnO$_2$ purity level was only 85%, fuel cell performance suffered greatly as compared with the control membrane consisting of Nafion® 1000 alone, without additive. Pure solid MnO$_2$ (0.5 g, Aldrich) was added to Nafion® solution D2020 at 20 wt. % polymer solids of Nafion® PFSA polymer, which was 1000 equivalent weight ionomer in 40-wt. % aqueous, 1-propanol (available from E.I. DuPont de Nemours, Co), to a 4-oz glass bottle, and then 5-mm glass bead grinding media (15 g, Fisher Scientific) were added. The lid of the jar was secured, and the jar was roll milled for a minimum of 16 hours. Thus the metal oxide was added at 10 wt. % solids based on dry Nafion® and was roll-milled with Nafion® 1000 (DE-2020) PFSA ionomer dispersion in aqueous, 1-propanol using glass beads as grinding media for at least 16 h to form a dispersion. The mixture was then filtered through 85-μm PTFE mesh and cast as films in two ways: (1) as a single layer 25 to 30-μm thick; and (2) as a sandwich structure coated in 3-layers consisting of [10-μm of Nafion® PFSA]/[10-μm of PFSA with dispersed metal oxide]/[10-μm of Nafion® PFSA]. Single layers were coated with a 3-mil gap Bird applicator with a masking tape spacer (of 85 microns) onto a glass plate with oven-drying at 120° C. for 30 minutes. The film was then floated off glass and used as a fuel cell membrane. When successive coatings were made, a 3-mil gap Bird applicator was used with drying at 80° C. for 30 minutes between each successive coating. The first coating was made with Nafion-solution alone. The second coating was made with Nafion® dispersion with metal oxide (MnO$_2$) and was applied to the first film with the 3-mil gap Bird applicator, and then polymer-coated glass plate was heated at 80° C. for 30 minutes. After a third layer of Nafion® solution alone was applied with the 3-mil gap Bird applicator, the polymer coated glass plate was heated at 120° C. for 16 hours. The coated glass plate, after cooling to 25° C., was immersed in a de-ionized water bath until the polymer film released from the glass. The polymer film was allowed to air dry on a paper towel, and the resultant dry film was 30-micrometers in thickness. The polymer film was cut into a 4-inch by 4-inch square and was assembled in a fuel cell (50-cm$^2$ active area) with catalyst coated diffusion media. The performance was measured under dry, intermediate and wet conditions. A durability test was performed under an accelerated 5-minute wet, 5-minute dry protocol, and the life of the single-coated membrane with MnO$_2$ was 1070 hours before a small pin-hole cross-over leak was detected. The fluoride release during the test was $10^{-7}$ g F$^-$ per cm$^2$ of membrane area per hour. No membrane thinning or platinum line was detected with this membrane. The membrane made as a sandwich structure failed shortly after break-in and this design failed to improve membrane life. Thus, the single layer structure is presumed to be better than the multi-layer sandwich structure.

Comparative Example 2

Nafion Membrane with 85 wt. %-Purity MnO$_2$

A dispersion of 10 wt. % MnO$_2$ (85 wt. % purity with particle size less than 5 micrometers available from Aldrich) in Nafion 1000 dispersion (DE 2020) was prepared by adding MnO$_2$ (0.33 grams) to Nafion 1000 dispersion (15 g at 20 wt. % resin solids) and glass beads (25 grams) in a 40-mL glass jar that was secured with a Teflon screw cap lid. This dispersion was then roll milled for one hour, filtered through 85-micrometer pore size Teflon filter cloth and cast as a film using a Bird applicator bar with a 0.277-millimeter coating gap onto float glass (8-inches×8-inches×0.25-inch). After heating 16 hours at 125° C., the film was floated off with deionized water and then air-dried. A 4-inch by 4-inch piece of the film (25-micron thickness) was built into a fuel cell with catalyst coated diffusion medium, and this fuel cell failed to operate. If more than 1 hour of roll milling was carried out to form the MnO$_2$-Nafion 1000 dispersion, the ionomer gelled and the dispersion could not be coated into a film. Thus, MnO$_2$ of 85. % purity was not useful as an additive to Nafion 1000 membrane at 10 wt. % loading because of poor performance, and particularly is not suitable in an automotive competitive fuel cell membrane.

Example 3

Nafion Membrane with CeO$_2$

Two types of metal oxides were used: nanoparticle ceria and nanoparticle ceria in water (Aldrich). The nanoparticle CeO$_2$ was added at 10 wt. % based on resin solids to a Nafion® solution and a dispersion was made with glass bead grinding media as in Example 2. The ceria dispersion was coated and dried as in example 2. A durability test was performed under an accelerated 5-minute wet, 5-minute dry protocol, and this single-layer, coated membrane with nanoparticle ceria did not develop any failures after more than 1510 hours and no cross-over leak was detected after this period of time. No membrane thinning or platinum line was detected with this membrane. The fluoride release during the test was $10^{-7}$ g F$^-$ per cm$^2$ of membrane area per hour. The membrane made as a sandwich structure failed shortly after break-in and this design failed to improve membrane life. Thus, the single layer structure is presumed to be better than the multi-layer sandwich structure.

Example 4

A Bilayer Nafion Membrane with Ceria (CeO$_2$) and MnO$_2$

A bilayer membrane structure was made with a membrane that was made by two coatings. The first coating with a 3-mil gap Bird applicator was with a Nafion® dispersion containing nanoparticle ceria prepared as in Example 3 and the second layer was made on top of the first ceria containing layer using a 3-mil coating gap Bird applicator with Nafion® dispersion with $MnO_2$, made as described in Example 2. A durability test was performed under an accelerated 5-minute wet, 5-minute dry protocol, and this single-layer, coated membrane with nanoparticle ceria (on the anode side) did not develop any failures after more than 1680 hours and no cross-over leak was detected after this period of time. The fluoride release during the test was $10^{-7}$ g $F^-$ per $cm^2$ of membrane area per hour. This membrane out-performed the respective membranes made as described in Examples 2 and 3.

Example 5

Nafion Membrane with $PtO_2$

A single-layer Nafion® membrane was made with dispersed $PtO_2$ at 10 wt. % loading based on ionomer. The membrane performed better than the Nafion control, but membrane life-time with a gas cross-over leak occurred soon after break-in. Consequently, durability was not improved but performance was improved especially under dry operating conditions. Reducing the loading from 10 wt. % to 5 wt. % $PtO_2$ and 1 wt. % $PtO_2$, respectively, based on ionomer resulted in both improved performance over the control and improved durability when compared to the membrane with 10 wt. % $PtO_2$.

Example 6

Nafion Membrane with $RuO_2$

A single-layer Nafion® membrane was made with dispersed $RuO_2$. The membrane performed better than the Nafion control, but membrane life-time with a gas cross-over leak occurred soon after break-in. Consequently, durability was not improved but performance was improved especially under dry operating conditions. Reducing the loading from 10 wt. % to 5 wt. % $RuO_2$ and 1 wt. % $RuO_2$, respectively, based on ionomer resulted in both improved performance over the control and improved durability when compared to the membrane with 10 wt. % $RuO_2$.

Example 7

Nafion Membrane with other Metal Oxides and Combinations of Metal Oxides

Nafion® membranes were made with other metal oxides including vanadium oxides (in the III, IV, and V oxidation states) $Co^{2+/3+}$ oxide (10 wt. % solids), $RuO_2$ (at 1 and 5 wt. % based on polymer solids), $PtO_2$ (at 1 and wt. % based on Nafion® solids), $MoO_2$, $Mo_2O_3$, and combinations of metal oxides. Enhancements in membrane life and performance, especially under dry conditions, were observed. Interestingly, $Co^{2+/3+}$ oxide was found to hurt performance unless it was mixed with nanoparticle ceria, in which case performance surprisingly improved. Vandium oxides with vanadium in the 3+ and 5+ oxidation states markedly improved the dry performance of the membrane, so much so that dry performance outperformed the wet and intermediate humidified membrane performance. However, life improvements with vanadium oxides with Nafion® alone were not improved. It was found that a membrane with ceria on the anode and $V_2O_3$ on the cathode not only performed better under dry operating conditions, but membrane life also improved dramatically.

Example 8

Membrane with Ceria Processed by Extrusion

Poly(tetrafluoroethylene-perflyuorosulfonyl fluoride) (DE-838WX film from E. I. DuPont de Nemours) is chopped with a Waring blender and nanoparticle ceria (Aldrich) is added at 10 wt. % based on polymer. The mixture is rapidly extruded at between 300 and 400° F. (350° F.) using a Dynisco Laboratory Mixing Extruder (model LME) equipped with an single-hole die. The strand is chopped with a Waring blender and is then extruded under the same conditions but the extruder is equipped with a ribbon die slot. The ribbon is then compressed between two rollers to produce a film containing ceria. The film is then immersed in 20 wt. % aqueous potassium hydroxide in dimethylsulfoxide for 16 hours. The film is then washed extensively with water and immersed in 2-normal sulfuric acid for 16 hours. The film is then washed with water until the pH of the water washes is near 7. In this way, ceria is melt-mixed into a perfluorosulfonic acid polymer membrane useful for fuel cells.

Example 9

Membrane with Ceria Processed by Compression Molding

A solution cast membrane with ceria is prepared as described in Example 2. The membrane is immersed in salt water and 50 wt. % sodium hydroxide is added drop-wise until the pH is near 10. The film is then washed extensively with water and then air dried. The film is then compression molded between 5-inch by 5-inch steel plates with a layer of Gylon® to distribute pressure and 5-mil Teflon release sheet at between 2000 to 6000 pounds pressure and 400° F. for between 4 and 20 minutes. The film is allowed to cool to room temperature and then is immersed in 2-normal sulfuric acid for 16 hours. The film is then extensively washed with water until the pH of the water washes is near 7. In this way, a perfluorosulfonic acid in the salt form with ceria is processed by compression molding to make a membrane that is useful for fuel cells.

What is claimed is:
1. A process comprising:
    forming a dispersion comprising a first ionomer, an additive, and at least one of an alcohol or water; said ionomer comprising a polymeric molecule having a carbon-fluorine backbone chain with perfluoro side chains containing sulfonic groups;
    casting and drying the dispersion to form a dried first layer comprising the first ionomer and additive, the additive comprising nanoparticles of a metal oxide having at least one dimension that is less than 200 nm and a metal oxide purity ranging from 90-100 percent pure, the nanoparticles of the metal oxide being present in at least one weight percent of the dried first layer, and wherein the nanoparticles of the metal oxide comprise one of the following: (1) $CeO_2$ and $CoO$; (2) $CeO_2$ and $Co_2O_3$; (3) $CeO_2$ and $VO$; (4) $CeO_2$ and $VO_2$; (5) $CeO_2$ and $V_2O_3$; (6) $CeO_2$ and $V_2O_5$; (7) $CeO_2$ and either $MoO_3$ or $MoO_2$; (8) $NiO_2$ and at least one of $RuO_2$, $WO_3$, $PtO_2$ or $SnO_2$; or (9) $CrO_2$ and at least one of $RuO_2$, $WO_3$, $PtO_2$ or $SnO_2$.

2. A process as set forth in claim 1 wherein the dispersion comprises water.

3. A process as set forth in claim 1 wherein the alcohol comprises at least one of ethanol, 1-propanol, 2-propanol, or 1-butanol.

4. A process as set forth in claim 1 wherein the first layer after the drying has a thickness ranging from 1-50 microns.

5. A process as set forth in claim 1 wherein the first layer after the drying has a thickness ranging from 5-35 microns.

6. A process as set forth in claim 1 wherein the first layer after the drying has a thickness ranging from 8-12 microns.

7. A process as set forth in claim 1 further comprising milling the dispersion prior to the casting and drying.

8. A process as set forth in claim 7 wherein the milling further comprises using glass beads as a grinding media.

9. A process as set forth in claim 1 wherein the metal oxide comprises one of the following: (1) $CeO_2$ and $VO_2$; (2) $CeO_2$ and $V_2O_3$; (3) $CeO_2$ and $V_2O_5$; (4) $CeO_2$ and either $MoO_3$ or $MoO_2$; or (5) $NiO_2$ and at least one of $RuO_2$, $WO_3$, $PtO_2$ or $CrO_2$.

10. A method as set forth in claim 1 wherein said first layer has a fluoride release rate in a fuel cell of $10^{-7}$ g fluoride per $cm^2$ per hour.

11. A product as set forth in claim 1 wherein the additive consists essentially of nanoparticles.

12. A process comprising:
   dispersing a first additive in a first ionomer to form a first mixture; said first additive comprising a nanoparticle of $CeO_2$, $NiO_2$ or $CrO_2$;
   forming a first fuel cell substrate layer from the first mixture;
   dispersing a second additive in a second ionomer to form a second mixture; said second additive comprising a nanoparticle of $MnO_2$, $CoO$, $Co_2O_3$, $VO$, $V_2O_3$, $VO_2$, $V_2O_5$, $MoO_2$, $MoO_3$, $RuO_2$, $PtO_2$, $WO_3$, or $SnO_2$;
   forming a second fuel cell substrate layer from the second mixture; and
   combining the first fuel cell substrate layer with the second fuel cell substrate layer.

13. A process as set forth in claim 12 wherein at least one of said first and second ionomers comprise a polymeric molecule having a carbon-fluorine backbone chain with perfluoro side chains containing sulfonic groups.

14. A process as set forth in claim 13 wherein the first fuel cell substrate layer is configured to be on the anode side and the second fuel cell substrate layer is configured to be on the cathode side of the fuel cell.

15. A process as set forth in claim 13; said combining comprising overlying said second fuel cell substrate layer over said first fuel cell substrate layer to form a fuel cell membrane layer.

16. A process as set forth in claim 12 further comprising forming a third fuel cell substrate layer comprising a third ionomer; said third fuel cell substrate layer being substantially free of metal oxides; and said combining comprising disposing said third fuel cell substrate layer between said first fuel cell substrate layer and said second fuel cell substrate layer.

17. A process as set forth in claim 12 wherein said first fuel cell substrate layer and said second fuel cell substrate layer are catalyst layers overlying a membrane layer of said fuel cell.

18. A process as set forth in claim 16 wherein the first additive is $CeO_2$ and the second additive is $MnO_2$, $V_2O_3$, or $V_2O_5$.

19. A process as set forth in 16 wherein the first fuel cell substrate layer is configured to be on the anode side and the second fuel cell substrate layer is configured to be on the cathode side of the fuel cell, and each of the first layer, second layer and third layer have a thickness ranging from 5-12 microns.

20. A process as set forth in claim 15 wherein said first additive is $CeO_2$ and said second additive is $MnO_2$, $V_2O_3$, or $V_2O_5$.

21. A process as set forth in claim 12 wherein said first fuel substrate layer and second fuel substrate layer are in direct contact with each other.

22. A process as set forth in claim 12 wherein said first mixture further comprises at least one of alcohol or water.

23. A process as set forth in claim 12 wherein said first mixture is a liquid mixture.

24. A process as set forth in claim 12 wherein said second mixture further comprises at least one of alcohol or water.

25. A process as set forth in claim 12 wherein said second mixture is a liquid mixture.

* * * * *